(12) United States Patent
Iwama

(10) Patent No.: US 12,549,693 B2
(45) Date of Patent: Feb. 10, 2026

(54) LIGHT SOURCE APPARATUS AND PROJECTOR

(71) Applicant: SEIKO EPSON CORPORATION, Tokyo (JP)

(72) Inventor: Yuichiro Iwama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/673,816

(22) Filed: May 24, 2024

(65) Prior Publication Data

US 2024/0397022 A1 Nov. 28, 2024

(30) Foreign Application Priority Data

May 26, 2023 (JP) .................. 2023-086974

(51) Int. Cl.
*H04N 9/31* (2006.01)

(52) U.S. Cl.
CPC ......... *H04N 9/3158* (2013.01); *H04N 9/3152* (2013.01)

(58) Field of Classification Search
CPC .. H04N 9/3158; H04N 9/3152; H04N 9/3164; G03B 21/204; G03B 21/208
See application file for complete search history.

(56) References Cited

U.S. PATENT DOCUMENTS

| | | | | |
|---|---|---|---|---|
| 9,016,872 B2* | 4/2015 | Aruga | ................. | G03B 21/005 353/97 |
| 11,150,548 B2* | 10/2021 | Suzuki | ............... | G03B 21/2066 |
| 11,669,006 B2* | 6/2023 | Sakata | ................. | G02B 6/0008 353/98 |
| 11,835,747 B2 | 12/2023 | Yu et al. | | |
| 11,953,818 B2* | 4/2024 | Iwama | ................. | G03B 21/006 |
| 12,321,090 B2* | 6/2025 | Aoki | ..................... | G03B 21/204 |
| 2020/0066945 A1* | 2/2020 | Sakata | ................... | G03B 33/06 |
| 2020/0201156 A1* | 6/2020 | Suzuki | ................. | H04N 9/3105 |
| 2021/0373222 A1* | 12/2021 | Van Bommel | ....... | G02B 6/0003 |
| 2022/0342137 A1* | 10/2022 | Yu | ........................ | G02B 6/0003 |
| 2023/0090913 A1* | 3/2023 | Hoelen | .............. | G02B 19/0066 362/551 |

FOREIGN PATENT DOCUMENTS

WO  WO 2020/254455 A1  12/2020

\* cited by examiner

*Primary Examiner* — Michael Lee
(74) *Attorney, Agent, or Firm* — Dority & Manning, P.A.

(57) ABSTRACT

A light source apparatus according to the present disclosure includes a light emitter that outputs light, a light guide member that the light emitted from the light emitter enters, an angle conversion member that converts the angular distribution of the light output from the light guide member, and a support member having a groove that supports the light guide member, the light emission surface of the light emitter facing a third surface of the light guide member, the groove having a support surface that supports a fourth surface of the light guide member, the light guide member including a first protrusion that protrudes from the groove toward one side of the first axis, the first protrusion having a first surface, the angle conversion member fixed to the first surface of the first protrusion, and the support member not being in contact with the first protrusion.

8 Claims, 5 Drawing Sheets

LIGHT SOURCE APPARATUS AND PROJECTOR

The present application is based on, and claims priority from JP Application Serial Number 2023-086974, filed May 26, 2023, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light emitted from a light emitter.

WO 2020/254455 discloses a light source apparatus including an excitation light source that outputs excitation light, a phosphor rod that converts the excitation light into fluorescence, and a heat conduction member that dissipates heat generated in the phosphor rod, with the phosphor rod disposed in a groove of the heat conduction member. In the light source apparatus, the phosphor rod is held in the groove of the heat conduction member with the phosphor rod pressed by a spring attached to a support.

WO 2020/254455 is an example of the related art.

SUMMARY

The light source apparatus disclosed in WO 2020/254455, in which the orientation of the light emission surface of the phosphor rod changes when the phosphor rod is lifted by foreign matter in the groove, has a problem that prevents the light source apparatus from providing desired optical characteristics particularly when the tip of the phosphor rod is lifted by the foreign matter to greatly incline the orientation of the light emission surface.

The light source apparatus involving wavelength conversion has been described above by way of example, and it is desired to provide a light source apparatus capable of providing desired optical characteristics even when the light source apparatus does not involve wavelength conversion.

To achieve the advantage described above, a light source apparatus according to an aspect of the present disclosure includes a light emitter that outputs light, a light guide member that the light emitted from the light emitter enters, an angle conversion member that converts an angular distribution of light output from the light guide member, and a support member having a groove that supports the light guide member, the light guide member having a first surface and a second surface located at sides opposite from each other in a first axis of the light guide member, a third surface and a fourth surface located at sides opposite from each other in a second axis that intersects with the first axis, and a fifth surface and a sixth surface located at sides opposite from each other in a third axis that intersects with the first and second axes, a light emission surface of the light emitter facing the third surface of the light guide member, the groove having a support surface that supports the fourth surface of the light guide member, the light guide member including a first protrusion that protrudes from the groove toward one side of the first axis, the first protrusion having the first surface, the angle conversion member fixed to the first surface of the first protrusion, and the support member not being in contact with the first protrusion.

A projector including the light source apparatus according to the aspect of the present disclosure, a light modulator that modulates light output from the light source apparatus in accordance with image information, and a projection optical apparatus that projects the light modulated by the light modulator.

DESCRIPTION OF EMBODIMENTS

An embodiment of the present disclosure will be described below.

A projector according to the present embodiment is an example of a projector using liquid crystal panels as light modulators.

In the following drawings, components are drawn at different dimensional scales in some cases for clarity of each of the components.

Figure 1:
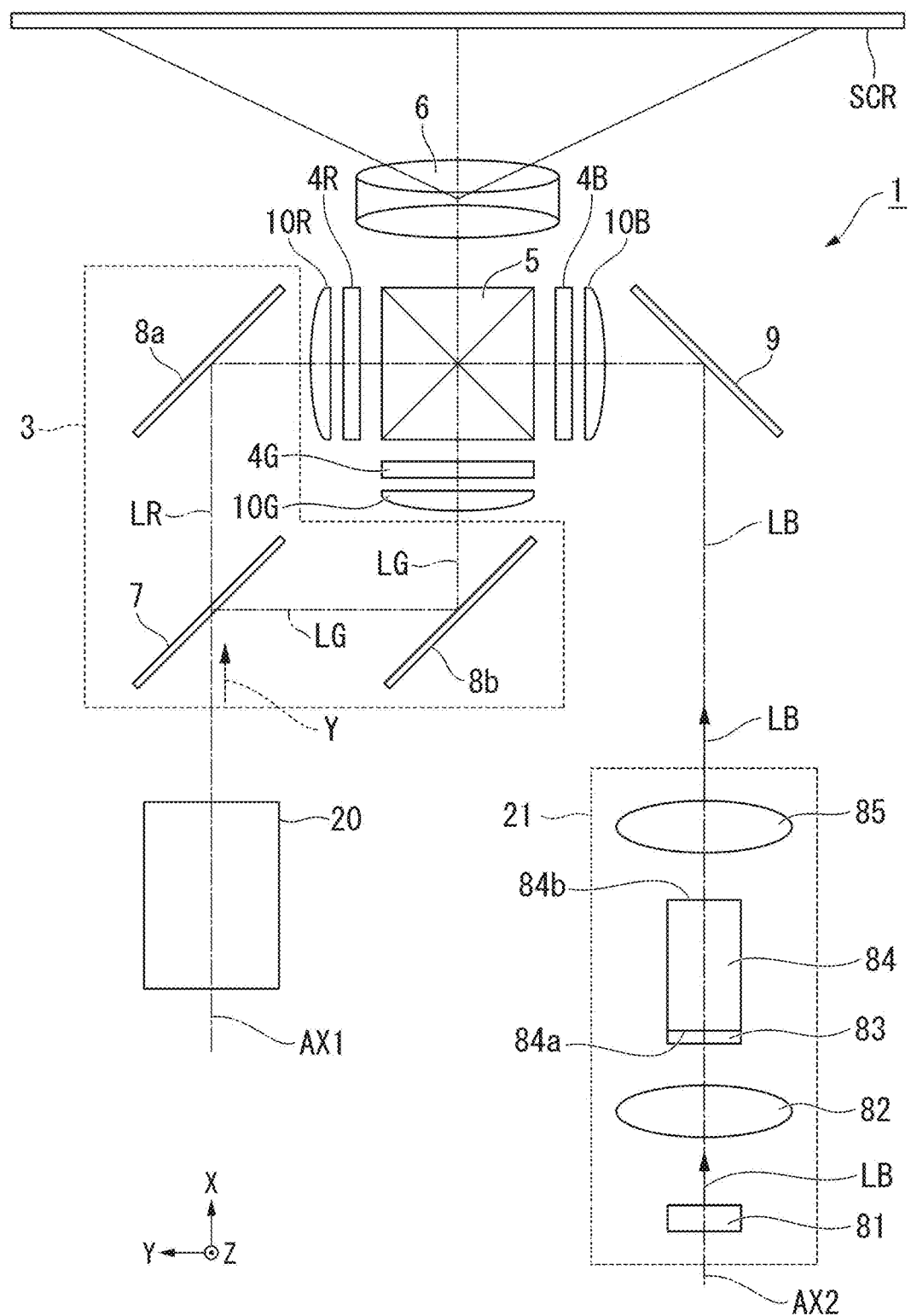
FIG. 1 shows a schematic configuration of a projector according to an embodiment.

FIG. 1 shows a schematic configuration of a projector 1 according to the present embodiment.

The projector 1 according to the present embodiment is a projection-type image display apparatus that displays a color image on a screen SCR, which is a projection receiving surface, as shown in FIG. 1. The projector 1 includes three light modulators corresponding to three types of color light, red light LR, green light LG, and blue light LB.

The projector 1 includes a first illuminator 20, a second illuminator 21, a color separation system 3, a light modulator 4R, a light modulator 4G, a light modulator 4B, a light combiner 5, and a projection optical apparatus 6.

The first illuminator 20 outputs yellow fluorescence Y toward the color separation system 3. The second illuminator 21 outputs the blue light LB toward the light modulator 4B. Detailed configurations of the first illuminator 20 and the second illuminator 21 will be described later.

The following description with reference to the drawings will be made by using an XYZ orthogonal coordinate systemin as required. The Z-axis is an axis extending along the vertical direction of the projector 1. The X-axis is an axis parallel to an optical axis AX1 of the first illuminator 20 and an optical axis AX2 of the second illuminator 21. The Y-axis is an axis perpendicular to the X-axis and the Z-axis. The optical axis AX1 of the first illuminator 20 is the center axis of the fluorescence Y output from the first illuminator 20. The optical axis AX2 of the second illuminator 21 is the center axis of the blue light LB output from the second illuminator 21. One of the two directions along the X-axis is referred to as a positive X direction, the opposite direction of the one direction is referred to as a negative X direction, one of the two directions along the Y-axis is referred to as a positive Y direction, the opposite direction of the one direction is referred to as a negative Y direction, one of the two directions along the Z axis is referred to as a positive Z direction, and the opposite direction of the one direction is referred to as a negative Z direction. When the two directions along the X-axis are not distinguished from each other, they are collectively referred to as an X-axis direction, when the two directions along the Y-axis are not distinguished from each other, they are collectively referred to as a Y-axis direction, and when the two directions along the Z-axis are not distinguished from each other, they are collectively referred to as a Z-axis direction.

The color separation system 3 separates the yellow fluorescence Y output from the first illuminator 20 into the red light LR and the green light LG. The color separation system 3 includes a dichroic mirror 7, a first reflection mirror 8a, and a second reflection mirror 8b.

The dichroic mirror 7 separates the fluorescence Y into the red light LR and the green light LG. The dichroic mirror 7 transmits the red light LR and reflects the green light LG. The second reflection mirror 8b is disposed in the optical path of the green light LG. The second reflection mirror 8b reflects the green light LG reflected off the dichroic mirror 7 toward the light modulator 4G. The first reflection mirror 8a is disposed in the optical path of the red light LR. The first reflection mirror 8a reflects the red light LR having passed through the dichroic mirror 7 toward the light modulator 4R.

On the other hand, the blue light LB output from the second illuminator 21 is reflected off a reflection mirror 9 toward the light modulator 4B.

The configuration of the second illuminator 21 will be described below.

The second illuminator 21 includes a light source section 81, a focusing lens 82, a diffuser plate 83, a rod lens 84, and a relay lens 85. The light source section 81 is formed of at least one semiconductor laser. The light source section 81 outputs the blue light LB formed of laser light. The light source section 81 is not necessarily formed of a semiconductor laser, and may be formed of an LED that emits blue light.

The focusing lens 82 is formed of a convex lens. The focusing lens 82 causes the blue light LB output from the light source section 81 to be incident on the diffuser plate 83 with the blue light LB substantially focused thereon. The diffuser plate 83 diffuses the blue light LB output from the focusing lens 82 into blue light LB diffused by a predetermined degree to generate blue light LB having a substantially uniform light orientation distribution similar to that of the fluorescence Y output from the first illuminator 20. The diffuser plate 83 is, for example, a ground glass plate made of optical glass.

The blue light LB diffused by the diffuser plate 83 enters the rod lens 84. The rod lens 84 has a quadrangular columnar shape extending along the direction of the optical axis AX2 of the second illuminator 21. The rod lens 84 has a light incident end surface 84a provided at one end and a light exiting end surface 84b provided at the other end. The diffuser plate 83 is fixed to the light incident end surface 84a of the rod lens 84 via an optical adhesive (not shown). It is desirable that the refractive index of the diffuser plate 83 matches as much as possible with the refractive index of the rod lens 84.

The blue light t LB propagates through the interior of the rod lens 84 while being totally reflected therein and therefore exits via the light exiting end surface 84b with the illuminance distribution uniformity of the blue light LB enhanced. The blue light LB output from the rod lens 84 enters the relay lens 85. The relay lens causes the blue light LB having the illuminance 85 distribution uniformity enhanced by the rod lens 84 to be incident on the reflection mirror 9.

The light exiting end surface 84b of the rod lens 84 has a rectangular shape substantially similar to the shape of an image formation region of the light modulator 4B. The blue light LB output from the rod lens 84 is thus efficiently incident on the image formation region of the light modulator 4B.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each, for example, a transmissive liquid crystal panel. Polarizers (not shown) are disposed at the light incident and exiting sides of each of the liquid crystal panels. The polarizers each transmit only linearly polarized light polarized in a specific direction.

A field lens 10R is disposed at the light incident side of the light modulator 4R. A field lens 10G is disposed at the light incident side of the light modulator 4G. A field lens 10B is disposed at the light incident side of the light modulator 4B. The field lens 10R causes the chief ray of the red light LR to be incident on the light modulator 4R to be parallel to the optical axis. The field lens 10G causes the chief ray of the green light LG to be incident on the light modulator 4G to be parallel to the optical axis. The field lens 10B causes the chief ray of the blue light LB to be incident on the light modulator 4B to be parallel to the optical axis.

The light combiner 5 receives the image light output from the light modulator 4R, the image light output from the light modulator 4G, and the image light output from the light modulator 4B, combines the image light corresponding to the red light LR, the image light corresponding to the green light LG, and the image light corresponding to the blue light LB with one another, and outputs the combined image light toward the projection optical apparatus 6. The light combiner 5 is, for example, a cross dichroic prism.

The projection optical apparatus 6 is formed of a plurality of projection lenses. The projection optical apparatus 6 enlarges the combined image light from the light combiner 5 and projects the enlarged image light toward the screen SCR. A color image is thus displayed on the screen SCR.

The configuration of the first illuminator 20 will be subsequently described.

Figure 2:
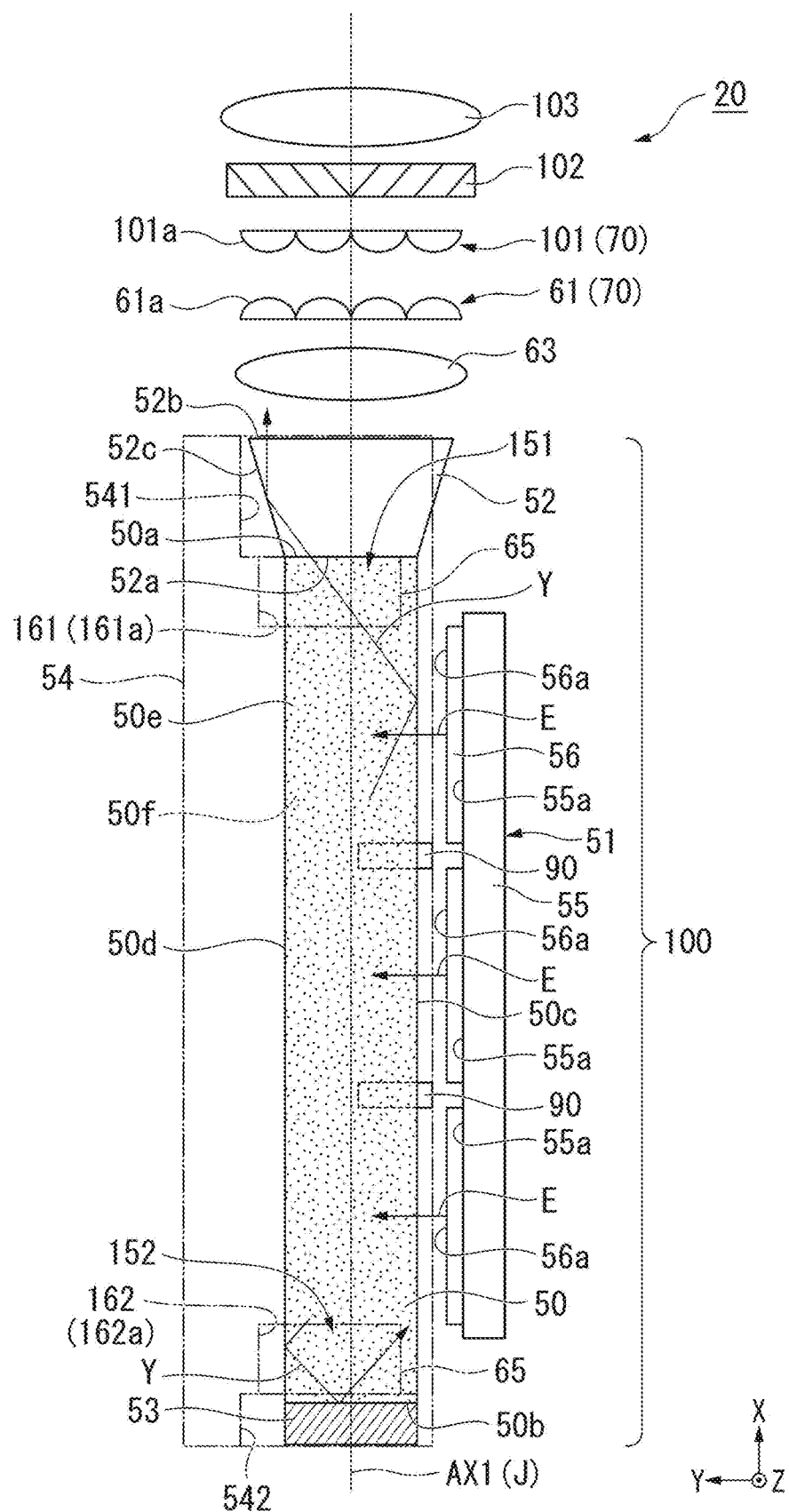
FIG. 2 is a schematic configuration diagram of a first illuminator.

FIG. 2 is a schematic configuration diagram of the first illuminator 20.

The first illuminator 20 includes a light source apparatus 100, an optical integration system 70, a polarization converter 102, and a superimposing system 103, as shown in FIG. 2.

The light source apparatus 100 includes a wavelength conversion member 50, a light source section 51, an angle conversion member 52, a mirror 53, a support member 54, position restrictors 65, and a pair of pressing members 90. The wavelength conversion member 50 in the present embodiment corresponds to the "light guide member" in the claims.

The wavelength conversion member 50 has a quadrangular columnar shape extending along the X-axis and has six surfaces. The sides of the wavelength conversion member 50 that extend long the X-axis are longer than the sides of the wavelength conversion member 50 that extend along the Y-axis and the sides thereof that extend in the Z-axis. The X-axis therefore corresponds to the lengthwise direction of the wavelength conversion member 50. The length of the sides extending along the Y-axis is equal to the length of the sides extending along the Z-axis. That is, the wavelength conversion member 50 has a square cross-sectional shape taken along a plane perpendicular to the X-axis and extending along the plane YZ. The wavelength conversion member 50 may instead have a quadrangular cross-sectional shape taken along a plane extending along the plane YZ.

The X-axis in the present embodiment corresponds to the "first axis" in the claims. The Y-axis in the present embodiment corresponds to the "second axis" in the claims. The Z-axis in the present embodiment corresponds to the "third axis" in the claims.

The wavelength conversion member 50 has a first surface 50a, a second surface 50b, a third surface 50c, a fourth surface 50d, a fifth surface 50e, and a sixth surface 50f. The first surface 50a and the second surface 50b intersect with the X-axis extending along the lengthwise direction of the wavelength conversion member 50, and are located at the sides opposite from each other in the X-axis. In the present embodiment, the first surface 50a is located so as to face the positive X direction, which corresponds to one of the X-axis directions along the X-axis, and the second surface 50b is located so as to face the negative X direction, which corresponds to the opposite direction of the one X-axis direction.

The third surface 50c and the fourth surface 50d intersect with the first surface 50a and the second surface 50b, and are located at positions opposite from each other in the Y-axis which intersects with the X-axis along the lengthwise direction of the wavelength conversion member 50, in the present embodiment, is perpendicular to the X-axis. In the present embodiment, the third surface 50c is located at a position facing the negative Y direction, which is one of the Y-axis directions along the Y-axis, and the fourth surface 50d is located at a position facing the positive Y direction, which is the other of the Y-axis directions.

The fifth surface 50e and the sixth surface 50f intersect with the third surface 50c and the fourth surface 50d, and are located at positions opposite from each other in the Z-axis which intersects with the X-axis and the Y-axis, in the present embodiment, is perpendicular thereto. In the present embodiment, the fifth surface 50e is located at a position facing the positive Z direction, which is one of the Z-axis directions, and the sixth surface 50f is located at a position facing the negative Z direction, which is the other of the Z-axis directions.

In the following description, when the third surface 50c, the fourth surface 50d, the fifth surface 50e, and the sixth surface 50f are not distinguished from each other, they may be simply referred to as side surfaces 50c, 50d, 50e, and 50f in some cases.

The wavelength conversion member 50 at least contains a phosphor and converts excitation light E emitted from the light emitters 56 of the light source section 51 and having a first wavelength band into the fluorescence Y having a second wavelength band different from the first wavelength band. The excitation light E enters the wavelength conversion member 50 via the third surface 50c. The fluorescence Y is guided through the interior of the wavelength conversion member 50 and then exits via the first surface 50a. The excitation light E in the present embodiment corresponds to "first light" in the claims. The fluorescence Y in the present embodiment corresponds to "second light" in the claims.

The wavelength conversion member 50 contains a ceramic phosphor formed of a polycrystal phosphor that converts the excitation light E in terms of wavelength into the fluorescence Y. The second wavelength band of the fluorescence Y is, for example, a yellow wavelength band ranging from 490 to 750 nm. That is, the fluorescence Y is yellow fluorescence containing a red light component and a green light component.

The wavelength conversion member 50 may contain a single crystal phosphor in place of a polycrystal phosphor. The wavelength conversion member 50 may instead be made of fluorescent glass. Still instead, the wavelength conversion member 50 may be formed of a binder which is made of glass or resin and in which a large number of phosphor particles are dispersed. The wavelength conversion member 50 made of any of the materials described above converts the excitation light E into the fluorescence Y.

Specifically, the material of the wavelength conversion member 50 contains, for example, an yttrium-aluminum-garnet-based (YAG-based) phosphor. Consider YAG: Ce, which contains cerium (Ce) as an activator, by way of example, and the wavelength conversion member 50 is made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The light source section 51 includes a substrate 55, a plurality of light emitters 56, and wiring lines that are not shown. Note that the light source section 51 may include other optical members such as light guide plates, diffuser plates, and lenses.

The plurality of light emitters 56 are provided at a surface 55a, which is one surface of the substrate 55. The number of light emitters 56 provided in the light source section 51 in the present embodiment is not limited to a specific number.

The light emitters 56 each have a light emission surface 56a, via which the excitation light E having the first wavelength band exits. The light emitters 56 are each formed, for example, of a light emitting diode (LED). The light emission surface 56a of each of the light emitters 56 faces the third surface 50c of the wavelength conversion member 50, and the light emitters 56 each output the excitation light E via the light emission surface 56a toward the third surface 50c. The first wavelength band is, for example, a blue-violet wavelength band ranging from 400 nm to 480 nm and has a peak wavelength of, for example, 445 nm. The light source section 51 is thus provided so as to face the third surface 50c, which is one of the four side surfaces 50c, 50d, 50e, and 50f extending along the lengthwise direction of the wavelength conversion member 50.

The support member 54 has a groove 154, which supports the wavelength conversion member 50. The support member 54 supports the wavelength conversion member 50 in the groove 154 to diffuse the heat generated in the wavelength conversion member 50 into the support member 54 and dissipate the heat out thereof. It is therefore desirable that the support member 54 be made of a material having predetermined strength and high thermal conductivity. It is desirable to use, for example, a metal such aluminum and stainless steel, in particular, an aluminum alloy such as a 6061 aluminum alloy as the material of the support member 54. A specific configuration of the support member 54 will be described later.

The position restrictors 65 along with the pair of pressing members 90 restrict the position of the wavelength conversion member 50 with respect to the support member 54. The position restrictors 65 restrict movement of the wavelength conversion member 50 toward the positive and negative ends of the Z direction along the Z-axis.

The pair of pressing members 90 restrict the Y-axis-direction position of the wavelength conversion member 50 with respect to the support member 54 in the groove 154. The pair of pressing members 90 are disposed so as to face a support surface 54s of the groove 154. The thus disposed pressing members 90 restrict the movement of the wavelength conversion member 50 in the Y-axis direction in the groove 154. The pressing members 90 are made of an elastically deformable material. The pressing members 90 are each formed, for example, of a leaf spring made of a metal material, for example, SUS 304 or any other stainless steel material.

The pair of pressing members 90 are disposed at positions where the pressing members 90 do not overlap with the light emitters 56 of the light source section 51, and press the wavelength conversion member 50 against the support surface 54s of the groove 154 of the support member 54. The pair of pressing members 90 are fixed to the support member 54.

The mirror 53 is provided at the second surface 50b of the wavelength conversion member 50. The mirror 53 reflects the fluorescence Y having been guided through the interior of the wavelength conversion member 50 and having reached the second surface 50b. The mirror 53 is formed of a metal film or a dielectric multilayer film formed at the second surface 50b of the wavelength conversion member 50.

In the first illuminator 20, when the excitation light E output from the light source section 51 enters the wavelength conversion member 50, the phosphor contained in the wavelength conversion member 50 is excited, and the fluorescence Y is emitted from random light emission points. The fluorescence Y travels omnidirectionally from the random light emission points, and the fluorescence Y traveling toward the four side surfaces 50c, 50d, 50e, and 50f is totally reflected off the side surfaces 50c, 50d, 50e, and 50f and travels toward the first surface 50a or the second surface 50b while totally reflected repeatedly at a plurality of locations. The fluorescence Y is guided and propagates through the interior of the wavelength conversion member 50 while being totally reflected, and exits via the first surface 50a. In the present embodiment, the fluorescence Y traveling toward the first surface 50a enters the angle conversion member 52 provided at the first surface 50a. The fluorescence Y traveling toward the second surface 50b is reflected off the mirror 53 and travels toward the first surface 50a.

Out of the excitation light E having entered the wavelength conversion member 50, part of the excitation light E that has not been used to excite the phosphor is reflected off members around the wavelength conversion member 50, including the light emitters 56 of the light source section 51, or the mirror 53 provided at the second surface 50b. The part of the excitation light E is therefore confined in the wavelength conversion member 50 and reused.

The angle conversion member 52 is provided at the first surface 50a of the wavelength conversion member 50. The angle conversion member 52 is formed, for example, of a tapered rod. The angle conversion member 52 has a light incident surface 52a, on which the fluorescence Y output from the wavelength conversion member 50 is incident, a light exiting surface 52b, via which the fluorescence Y exits, and a side surface 52c, which reflects the incident fluorescence Y toward the light exiting surface 52b.

The angle conversion member 52 has a truncated quadrangular pyramidal shape, and has a cross-sectional area that is perpendicular to an optical axis J and widens along the light traveling direction. The area of the light exiting surface 52b is therefore greater than the area of the light incident surface 52a. The optical axis J of the angle conversion member 52 is the axis passing through the centers of the light exiting surface 52b and the light incident surface 52a and parallel to the axis X. The optical axis J of the angle conversion member 52 coincides with the optical axis AX1 of the first illuminator 20.

The fluorescence Y having entered the angle conversion member 52 changes its orientation while traveling through the interior of the angle conversion member 52 in such a way that the direction of the fluorescence Y approaches the direction parallel to the optical axis J whenever the fluorescence Y is totally reflected off the side surface 52c. The angle conversion member 52 thus converts the exiting angle distribution of the fluorescence Y having exited via the first surface 50a of the wavelength conversion member 50. Specifically, the angle conversion member 52 makes the largest exiting angle of the fluorescence Y at the light exiting surface 52b smaller than the largest incident angle of the fluorescence Y at the light incident surface 52a.

In general, since the etendue of light specified by the product of the area of a light exiting region and the largest exiting angle, which is the solid angle of the light, is preserved, the etendue of the fluorescence Y before the fluorescence Y passes through the angle conversion member 52 is preserved after the passage. The angle conversion member 52 has the configuration in which the area of the light exiting surface 52b is greater than the area of the light incident surface 52a, as described above. The angle conversion member 52 can therefore make the largest exiting angle of the fluorescence Y at the light exiting surface 52b smaller than the largest incident angle of the fluorescence Y at the light incident surface 52a from the viewpoint of the etendue preservation.

The angle conversion member 52 is fixed to the wavelength conversion member 50 via an optical adhesive that is not shown so that the light incident surface 52a faces the first surface 50a of the wavelength conversion member 50. That is, the angle conversion member 52 and the wavelength conversion member 50 are in contact with each other via the optical adhesive, and there is no air gap, for example, an air layer between the angle conversion member 52 and the wavelength conversion member 50. If there is an air gap between the angle conversion member 52 and the wavelength conversion member 50, out of the fluorescence Y having reached the light incident surface 52a of the angle conversion member 52, the fluorescence Y incident on the light incident surface 52a at angles of incidence greater than the critical angle is totally reflected off the light incident surface 52a and cannot enter the angle conversion member 52. In contrast, when there is no air gap between the angle conversion member 52 and the wavelength conversion member 50, as in the present embodiment, the amount of lost component of the fluorescence Y that cannot enter the angle conversion member 52 due to the total reflection can be reduced. It is desirable from the viewpoint described above that the refractive index of the angle conversion member 52 match as much as possible with the refractive index of the wavelength conversion member 50.

As the angle conversion member 52, the tapered rod may be replaced with a compound parabolic concentrator (CPC). The same effect is provided both when a CPC is used as the angle conversion member 52 and when a tapered rod is used as the angle conversion member 52. The light source apparatus 100 may not necessarily include the angle conversion member 52.

A parallelizing system 63, which is formed, for example, of a collimator lens, is provided between the light source apparatus 100 and the optical integration system 70. The parallelizing system 63 further narrows the angular distribution of the fluorescence Y output from the angle conversion member 52 and causes the resultant fluorescence Y having a high degree of parallelism to enter the optical integration system 70. The parallelizing system 63 may not be provided when the fluorescence Y output from the angle conversion member 52 has a sufficiently high degree of parallelism.

The optical integration system 70 includes a first lens array 61 and a second lens array 101. The optical integration system 70, along with the superimposing system 103, functions as an illumination homogenizing system that homogenizes the intensity distribution of the fluorescence Y output from the light source apparatus 100 at each of the light modulators 4R and 4G, which are illumination receiving regions. The fluorescence Y output from the parallelizing system 63 enters the first lens array 61. The first lens array 61, along with the second lens array 101 provided at a position downstream from the light source apparatus 100, forms the optical integration system 70.

The first lens array 61 includes a plurality of first lenslets 61a. The plurality of first lenslets 61a are arranged in a matrix in a plane parallel to the plane YZ perpendicular to the optical axis AX1 of the first illuminator 20. The plurality of first lenslets 61a divide the fluorescence Y output from the angle conversion member 52 into a plurality of sub-luminous fluxes. The first lenslets 61a each have a rectangular shape substantially similar to the shape of the image formation region of each of the light modulators 4R and 4G. The sub-luminous fluxes output from the first lens array 61 are thus each efficiently incident on the image formation region of each of the light modulators 4R and 4G.

The fluorescence Y output from the first lens array 61 travels toward the second lens array 101. The second lens array 101 is disposed so as to face the first lens array 61. The second lens array 101 includes a plurality of second lenslets 101a corresponding to the plurality of first lenslets 61a of the first lens array 61. The second lens array 101, along with the superimposing system 103, brings images of the plurality of first lenslets 61a of the first lens array 61 into focus in the vicinity of the image formation region of each of the light modulators 4R and 4G. The plurality of second lenslets 101a are arranged in a matrix in a plane parallel to the plane YZ perpendicular to the optical axis AX1 of the first illuminator 20.

In the present embodiment, the first lenslets 61a of the first lens array 61 and the second lenslets 101a of the second lens array 101 have the same size, and may instead have sizes different from each other. In the present embodiment, the first lenslets 61a of the first lens array 61 and the second lenslets 101a of the second lens array 101 are so disposed that the optical axes thereof coincide with each other, and may instead be so disposed that the optical axes thereof deviate from each other.

The polarization converter 102 converts the polarization direction of the fluorescence Y output from the second lens array 101. Specifically, the polarization converter 102 converts the sub-luminous fluxes of the fluorescence Y into which the first lens array 61 divides the fluorescence Y and which exit out of the second lens array 101 into linearly polarized luminous fluxes.

The polarization converter 102 includes polarization separation layers that are not shown but directly transmit one of the linearly polarized components contained in the fluorescence Y output from the light source apparatus 100 and reflect another one of the linearly polarized components in a direction perpendicular to the optical axis AX1, reflection layers that are not shown but reflect the other linearly polarized component reflected off the polarization separation layers in the direction parallel to the optical axis AX1, and retarders that are not shown but convert the other linearly polarized component reflected off the reflection layers into the one linearly polarized component.

Figure 3:
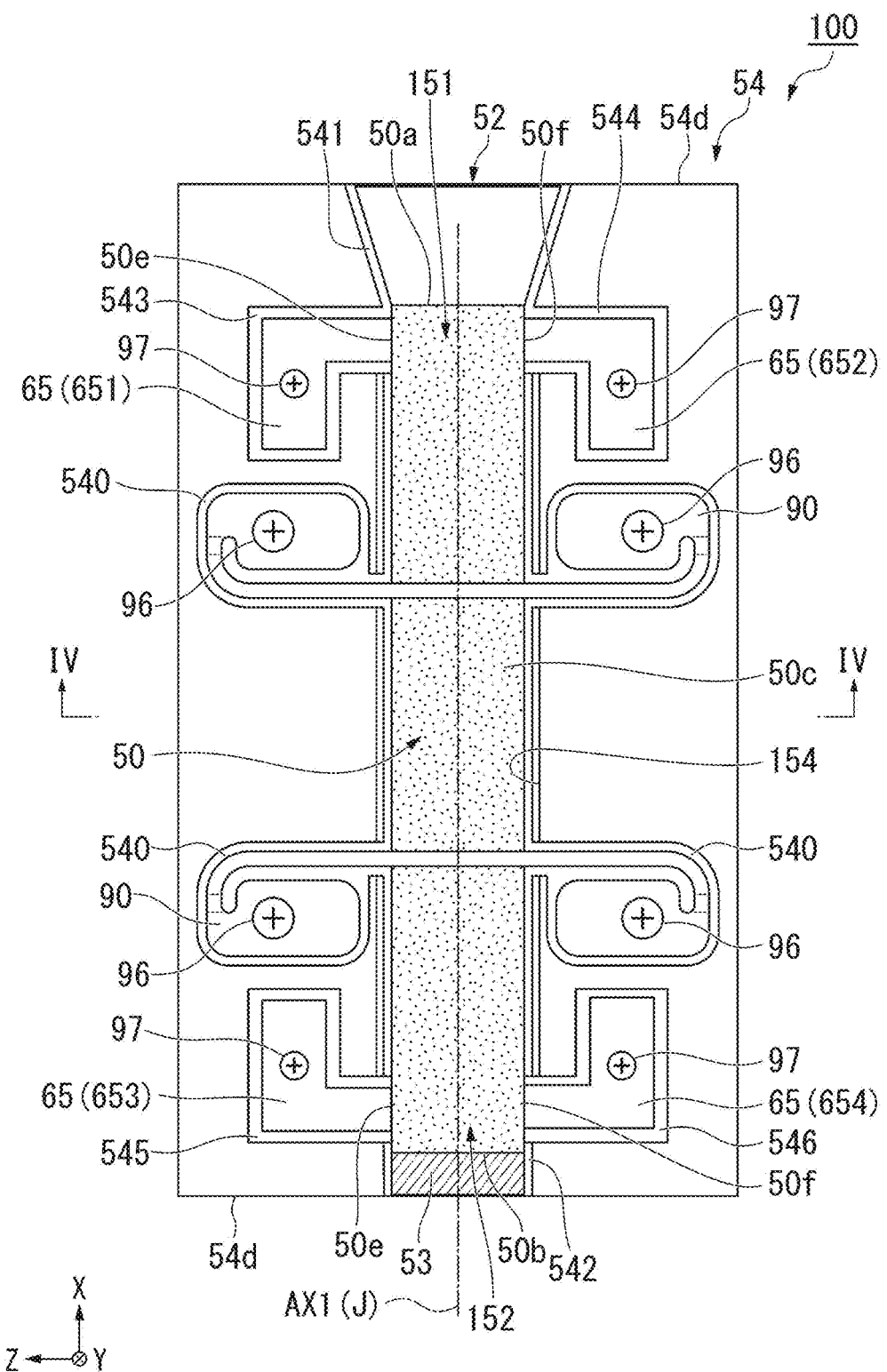
FIG. 3 is a plan view of a light source apparatus viewed in a Y-axis direction.
Figure 4:
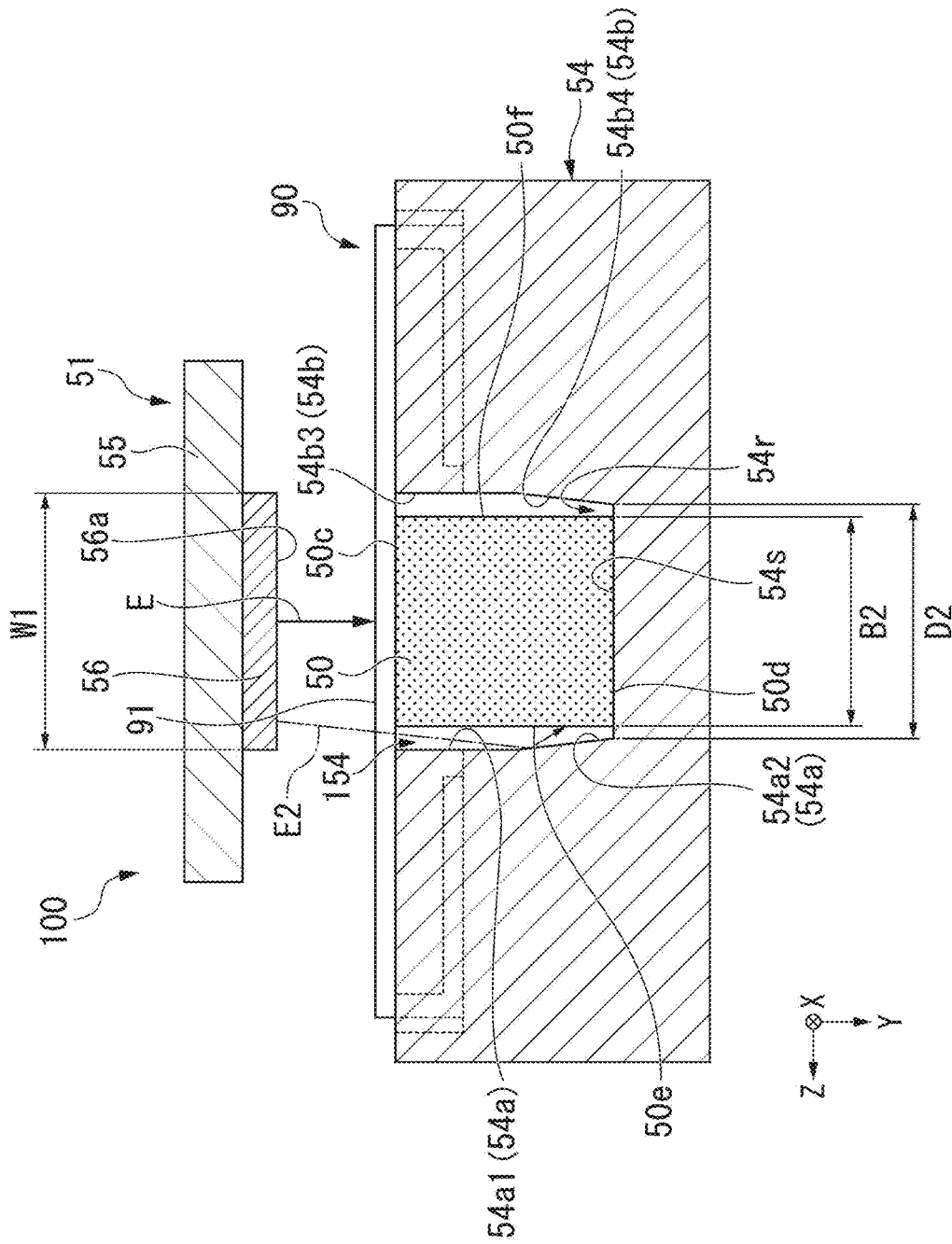
FIG. 4 is a cross-sectional view of the light source apparatus taken along the line IV-IV in FIG. 3.

FIG. 3 is a plan view of the light source apparatus 100 viewed in the Y-axis direction. FIG. 4 is a cross-sectional view of the light source apparatus 100 taken along the line IV-IV in FIG. 3.

The support member 54 is a plate-shaped member having a rectangular planar shape and including the groove 154, spring fixing sections 540, a first container 541, a second container 542, a third container 543, a fourth container 544, a fifth container 545, and a sixth container 546, as shown in FIG. 3.

The groove 154 extends in the X-axis direction along the lengthwise direction of the wavelength conversion member 50 and houses part of the wavelength conversion member 50. The wavelength conversion member 50 in the present embodiment includes a first protrusion 151, which protrudes from the groove 154 toward the positive X direction, and a second protrusion 152, which protrudes from the groove 154 toward the negative X direction.

The first protrusion 151 is a portion having the first surface 50a, and end portions of the third surface 50c, the fourth surface 50d, the fifth surface 50e, and the sixth surface 50f that face the positive X direction. The second protrusion 152 is a portion having the second surface 50b, and end portions of the third surface 50c, the fourth surface 50d, the fifth surface 50e, and the sixth surface 50f that face the negative X direction.

That is, opposite end portions of the wavelength conversion member 50 protrude outward from the groove 154 of the support member 54.

The spring fixing sections 540 are disposed at opposite sides of the groove 154 in the Z-axis direction along the widthwise direction of the wavelength conversion member 50. The spring fixing sections 540 fix opposite end portions of the pressing members 90 with screws 96 with the pressing members 90 disposed so as to extend over and beyond the wavelength conversion member 50 in the Z-axis direction.

The groove 154 of the support member 54 has a U-shaped cross section perpendicular to the X-axis direction, as shown in FIG. 4. The groove 154 has the support surface 54s, a first wall surface 54a, and a second wall surface 54b. The groove 154 is formed by cutting a metal such as aluminum or stainless steel, of which the support member 54 is made.

The support surface 54s corresponds to the bottom of the groove 154. In the present embodiment, the support surface 54s is a surface extending in parallel to the plane XZ and supports the fourth surface 50d of the wavelength conversion member 50. The first wall surface 54a corresponds to one side surface of the groove 154, faces the fifth surface 50e of the wavelength conversion member 50, and is separate from the fifth surface 50e. That is, a gap is provided between the first wall surface 54a and the fifth surface 50e of the wavelength conversion member 50. The second wall surface 54b corresponds to the other side surface of the groove 154, faces the sixth surface 50f of the wavelength conversion member 50, and is separate from the sixth surface 50f. That is, a gap is provided between the second wall surface 54b and the sixth surface 50f of the wavelength conversion member 50.

The first wall surface 54a includes a first section 54a1, which is located at the side close to the third surface 50c, and a second section 54a2, which is located at the side close to the support surface 54s. The first section 54a1 extends in the direction perpendicular to the support surface 54s, that is, in parallel to the XY plane. The second section 54a2 inclines so as to approach the fifth surface 50e as extending from the side close to the first section 54a1 toward the support surface 54s. In other words, the distance between the fifth surface 50e and the second section 54a2 close to the support surface 54s is smaller than the distance between the fifth surface 50e and the second section 54a2 close to the first section 54a1.

The second wall surface 54b includes a third section 54b3, which is located at the side close to the third surface 50c, and a fourth section 54b4, which is located at the side close to the support surface 54s. The third section 54b3 extends in the direction perpendicular to the support surface 54s, that is, in parallel to the XY plane. The fourth section 54b4 inclines so as to approach the sixth surface 50f as extending from the side close to the third section 54b3 toward the support surface 54s. In other words, the distance between the sixth surface 50f and the fourth section 54b4 close to the support surface 54s is smaller than the distance between the sixth surface 50f and the fourth section 54b4 close to the third section 54b3.

The first wall surface 54a and the second wall surface 54b are each formed of a surface made, for example, of aluminum, stainless steel, or any other metal of which the support member 54 is made. More specifically, the first wall surface 54a and the second wall surface 54b are each formed of a processed surface that is the metal surface described above on which a mirror finishing treatment has been performed. The first wall surface 54a and the second wall surface 54b therefore each have light reflectivity and reflect the excitation light E incident thereon. Note that the first wall surface 54a and the second wall surface 54b may each be formed of another metal film or dielectric multilayer film formed at the surface made of aluminum, stainless steel, or any other metal.

Since the first wall surface 54a and the second wall surface 54b of the groove 154 need to go through a mirror finishing treatment as described above, the portion where the groove 154 is provided requires higher processing accuracy than other portions of the support member 54. The portion of the support member 54 where the groove 154 is provided may therefore be formed of a separate member, and combined with another separate member in which the portions other than the groove 154 are formed to form a single support member 54. That is, the support member 54 may be formed as the combination of a plurality of members. The configuration described above, in which the peripheral portion of the groove 154 is formed of a separate member, allows improvement in workability and processing accuracy of the first wall surface 54a and the second wall surface 54b of the groove 154.

A dimension W1, along the Z-axis direction, of the light emission surface 56a of each of the light emitters 56 is greater than a width B2, along the Z-axis direction, of the wavelength conversion member 50. Note that the width, in the Z-axis direction, of the wavelength conversion member 50 of the present embodiment is uniform over the entire lengthwise length of the wavelength conversion member 50.

Opposite end portions of the light emission surface 56a of each of the light emitters 56 therefore protrude beyond the third surface 50c of the wavelength conversion member 50 in the Z-axis direction. Specifically, the opposite end positions of the light emission surface 56a of each of the light emitters 56 extend off to positions where one of the opposite end portions overlaps with the gap between the fifth surface 50e and the first wall surface 54a and the other opposite end position overlaps with the gap between the sixth surface 50f and the second wall surface 54b. In other words, when the light emission surface 56a is viewed from the side facing the support surface 54s along the Y-axis direction, a portion of the light emission surface 56a overlaps with the third surface 50c, and the other portion of the light emission surface 56a overlaps with the gap between the fifth surface 50e and the first wall surface 54a and the gap between the sixth surface 50f and the second wall surface 54b.

A first width D2, along the Z-axis direction, of the support surface 54s of the support member 54 is greater than the width B2, along the Z-axis direction, of the wavelength conversion member 50. The opposite end portions of the support surface 54s therefore extend off the fourth surface 50d of the wavelength conversion member 50 in the Z-axis direction. In other words, when the support surface 54s is viewed from the side facing the light emission surface 56a along the Y-axis direction, a portion of the support surface 54s overlaps with the fourth surface 50d, and the other portion of the support surface 54s is exposed to the space outside the fourth surface 50d. The support surface 54s thus has an exposed section 54r exposed to the space outside the wavelength conversion member 50.

In the light source apparatus 100 according to the present embodiment, excitation light E2, which is part of the excitation light E output via the light emission surface 56a of each of the light emitters 56, passes through the gap between the fifth surface 50e of the wavelength conversion member 50 and the first section 54a1, and is then incident on the second section 54a2, which inclines with respect to the support surface 54s. In this process, the excitation light E2 is reflected off the second section 54a2 and incident on the fifth surface 50e of the wavelength conversion member 50. The excitation light E2 passing through the gap between the fifth surface 50e of the wavelength conversion member 50 and the first wall surface 54a is thus likely to be incident on the fifth surface 50e, whereby the amount of excitation light E that is reflected off the support surface 54s and returns toward the light source section 51 can be reduced. Furthermore, part of the excitation light E is reflected off the first section 54a1, which extends in the direction perpendicular to the support surface 54s, and is incident on the fifth surface 50e of the wavelength conversion member 50. The light source apparatus 100 achieved in accordance with the present embodiment can therefore efficiently use the excitation light E and readily generate fluorescence Y having desired intensity.

Referring back to FIG. 3, the first container 541 is a recess that communicates with the groove 154 in the positive X direction. The first container 541 passes through the support member 54 to an outer edge 54d thereof. The first container 541 houses the first protrusion 151 of the wavelength conversion member 50, which protrudes from the groove 154. The first container 541 holds the angle conversion member 52 fixed to the first surface 50a of the wavelength conversion member 50. In the present embodiment, the angle conversion member 52 fixed to the first surface 50a of the first protrusion 151 is held by the support member 54.

The light exiting surface 52b of the angle conversion member 52 housed in the first container 541 is flush with the outer edge 54d of the support member 54 in the plan view.

The second container 542 is a recess that communicates with the groove 154 in the negative X direction. The second container 542 passes through the support member 54 to the outer edge 54d thereof. The second container 542 houses the second protrusion 152 of the wavelength conversion member 50, which protrudes from the groove 154. The second container 542 is provided so as not to communicate with the outer edge 54d of the support member 54. The second container 542 houses the second protrusion 152 of the wavelength conversion member 50, which protrudes from the groove 154. In the present embodiment, the mirror 53 is provided at the second surface 50b of the second protrusion 152. The second container 542 houses the mirror 53 provided at the second surface 50b of the wavelength conversion member 50.

The third container 543 is a recess that communicates with the first container 541 in the positive Z direction. The third container 543 houses the position restrictor 65 that holds a portion of the first protrusion 151 of the wavelength conversion member 50 housed in the first container 541, the portion facing the positive Z direction.

The fourth container 544 is a recess that communicates with the first container 541 in the negative Z direction. The fourth container 544 houses the position restrictor 65 that holds a portion of the first protrusion 151 of the wavelength conversion member 50 housed in the first container 541, the portion facing the negative Z direction.

The fifth container 545 is a recess that communicates with the second container 542 in the positive Z direction. The fifth container 545 houses the position restrictor 65 that holds a portion of the second protrusion 152 of the wavelength conversion member 50 housed in the second container 542, the portion facing the positive Z direction.

The sixth container 546 is a recess that communicates with the third container 543 in the negative Z direction. The sixth container 546 houses the position restrictor 65 that holds a portion of the second protrusion 152 of the wavelength conversion member 50 housed in the second container 542, the portion facing the negative Z direction.

The position restrictors 65 hold the first protrusion 151 or the second protrusion 152, which protrudes from the groove 154 of the support member 54, to restrict the position of the first protrusion 151 and the second protrusion 152 with respect to the groove 154. The position restrictors 65 include a pair of restriction members 651 and 652, which hold the first protrusion 151, and a pair of restriction members 653 and 654, which hold the second protrusion 152.

The restriction member 651, which is one of the restriction members 65 that hold the first protrusion 151, is fixed to the third container 543 with a screw 97, and the restriction member 652, which is the other of the restriction members 65 that hold the first protrusion 151, is fixed to the fourth container 544 with another screw 97. The restriction member 653, which is one of the restriction members 65 that hold the second protrusion 152, is fixed to the fifth container 545 with another screw 97, and the restriction member 654, which is the other of the restriction members 65 that hold the second protrusion 152, is fixed to the sixth container 546 with another screw 97. In the present embodiment, the restriction member 652 corresponds to the "first position restriction member" in the claims, and the restriction member 651 corresponds to the "second position restriction member" in the claims.

Note that the positions of the pair of restriction members 651 and 652 with respect to each other in the Z-axis direction are adjustable by an adjustment mechanism that is not shown. Similarly, the positions of the pair of restriction members 653 and 654 with respect to each other in the Z-axis direction are adjustable by an adjustment mechanism that is not shown.

The wavelength conversion member 50 in the present embodiment is thus held in the groove 154 with the movement of the first protrusion 151 and the second protrusion 152, which protrude outward from the groove 154, restricted in the Z-axis direction by the position restrictors 65.

In the present disclosure, attention is paid to the disadvantageous possibility of entry of foreign matter to the space between the wavelength conversion member 50 and the groove 154 when the elongated wavelength conversion member 50 is disposed in the groove 154. Examples of the foreign matter may include dust, dirt, and other types of trash, and burrs produced when the groove 154 is cut. In the present disclosure, it is found that the influence of the foreign matter that enters the space between the fourth surface 50d and the support surface 54s on the light emission characteristics of the light source apparatus varies in accordance with the position of the foreign matter. For example, even when foreign matter enters the groove 154 at the center in the X direction along the lengthwise direction thereof, the wavelength conversion member 50 is bent by the pressing force produced by the pressing members 90, so that the light-exiting-side end portion of the wavelength conversion member 50 can be brought into good contact with the support surface 54s of the groove 154. That is, the orientation of the angle conversion member 52 fixed to the first surface 50a of the wavelength conversion member 50 does not greatly change. Therefore, even if foreign matter enters a lengthwise central portion of the groove 154, it can be said that the light emission characteristics of the light source apparatus 100 is affected only by a small degree.

On the other hand, consider a case where foreign matter enters the groove 154 at a position shifted from the pressing members 90 toward the light exiting end. For example, when foreign matter enters the space between the fourth surface 50d and the support surface 54s at the light-exiting-surface-side end portion of the groove 154, it is difficult to bend the light-exiting-side end portion of the wavelength conversion member 50 toward the support surface 54s of the groove 154 to bring the end portion into good contact with the support surface 54s of the groove 154 even through the pressing action of the pressing members 90. That is, the orientation of the angle conversion member 52 fixed to the first surface 50a greatly changes when the light-exiting-side end portion of the wavelength conversion member 50 is lifted by the foreign matter, so that the light output from the angle member 52 may not efficiently enter the downstream optical member. Therefore, when the light-exiting-side end portion of the wavelength conversion member 50 is lifted by the foreign matter, the light emission characteristics of the light source apparatus 100 are greatly affected.

On the other hand, it is difficult to prevent burrs from being generated when the groove 154 is cut, and complete removal of the burrs requires labor and cost at the time of manufacturing, resulting in poor practicability. Furthermore, in view of the characteristics of the cutting process, it is known that the burrs are more likely to be generated at end portions of the groove 154 than at the central portion thereof.

In the present disclosure, it is believed that when the entire wavelength conversion member is supported in the groove, the orientation of the angle conversion member greatly changes due to the light-exiting-side end portion of the wavelength conversion member lifted by the burrs, so that the light output from the angle conversion member unfortunately cannot efficiently enter the downstream optical member. The configuration of the light source apparatus 100 according to the present embodiment has been achieved based on the idea described above.

The features of the light source apparatus 100 according to the present embodiment, which solves the problem described above, will be described below.

In the light source apparatus 100 according to the present embodiment, the support member 54 has a structure that causes the support member 54 not to be in contact with the first protrusion 151 or the second protrusion 152 of the wavelength conversion member 50.

Specifically, the support member 54 includes a first facing section 161, which faces the fourth surface 50d of the first protrusion 151, and a second facing section 162, which faces the fourth surface 50d of the second protrusion 152, as shown in FIG. 2. The first facing section 161 is provided in the first container 541, and the second facing section 162 is provided in the second container 542.

The first facing section 161 in the present embodiment corresponds to the "facing section" in the claims. The first facing section 161 and the second facing section 162 have the same configuration. The following description will therefore be made with reference to the configuration of the first facing section 161 by way of example, and the configuration of the second facing section 162 will not be described.

Figure 5:
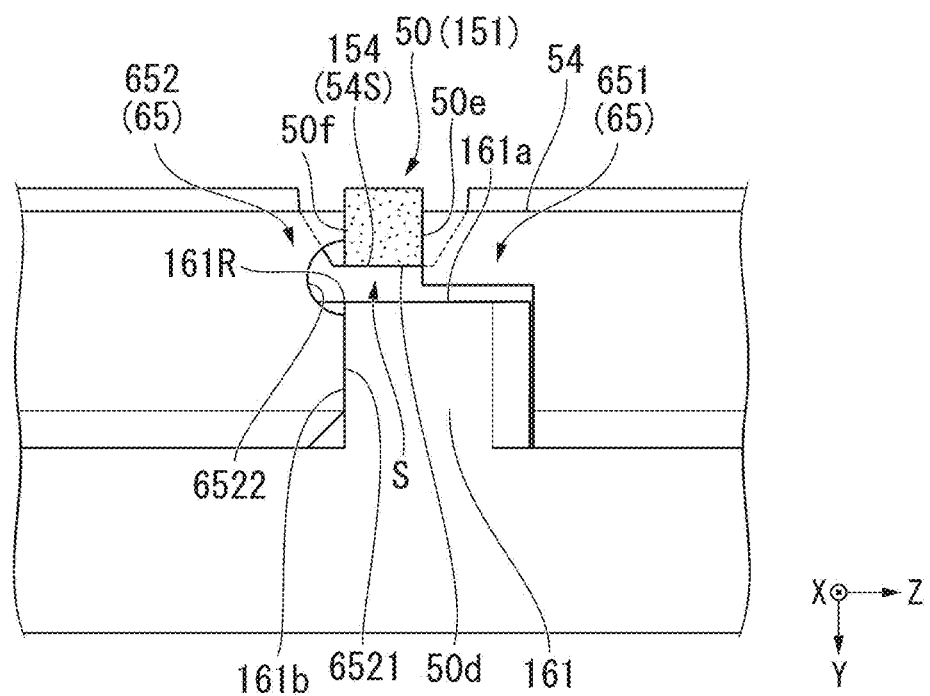
FIG. 5 is a front view showing the configuration of a first facing section of a support member.
Figure 6:
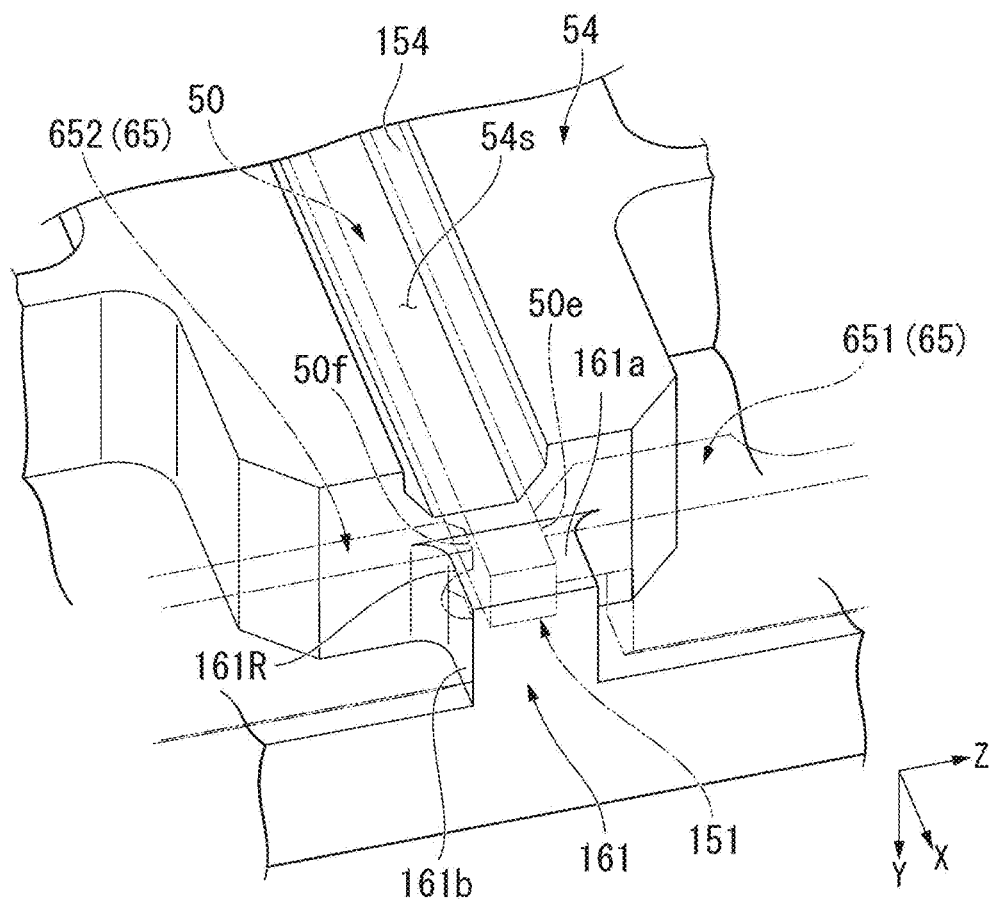
FIG. 6 is a perspective view showing the configuration of the first facing section of the support member.

FIG. 5 is a front view showing the configuration of the first facing section 161 of the support member 54. FIG. 6 is a perspective view showing the configuration of the first facing section 161 of the support member 54.

The first facing section 161 is disposed at a position recessed from the support surface 54s of the groove 154 in the direction along the Y-axis, and has a facing surface 161a, which faces the fourth surface 50d of the first protrusion 151, as shown in FIGS. 5 and 6. A gap S is provided between the facing surface 161a of the first facing section 161 and the fourth surface 50d of the first protrusion 151. The first facing section 161 of the support member 54 is not in contact with the first protrusion 151 of the wavelength conversion member 50. That is, the wavelength conversion member 50 in the present embodiment is not in contact with the first facing section 161.

The facing surface 161a of the first facing section 161 has a structure that causes the facing surface 161a to be one step lower than the support surface 54s of the groove 154 toward the positive Y direction. The first facing section 161 in the present embodiment is formed in the same process of cutting the groove 154. The burrs generated by the cutting process may therefore adhere as foreign matter to the end surface of the facing surface 161a.

In the light source apparatus 100 according to the present embodiment, even when burrs are formed at the end surface of the first facing section 161, a gap is present between the burrs and the fourth surface 50d of the first protrusion 151, so that the burrs are not come in contact with the first protrusion 151. That is, the first protrusion 151 of the wavelength conversion member 50, which protrudes from the groove 154, is not lifted by the burrs. The lift of the first protrusion 151 located at the one end side of the elongated wavelength conversion member 50 is therefore suppressed, so that the change in the orientation of the angle conversion member 52 fixed to the first surface 50a of the first protrusion 151 can be suppressed.

In the present embodiment, the angle conversion member 52 is held in the first container 541 of the support member 54. Therefore, when the first protrusion 151 is lifted by the burrs so that the orientation of the angle conversion member 52 changes, stress is induced in a fixing portion of the angle conversion member 52 that is fixed to the first surface 50a, possibly resulting in breakage of the fixing portion. The light source apparatus 100 according to the present embodiment can prevent the breakage described above due to the change in the orientation of the angle conversion member 52.

In the present embodiment, the restriction member 652 has a contact surface 6521, which is in contact with a side surface 161b of the first facing section 161, which is the side surface facing the negative Z direction, and a cutout 6522 provided at part of the contact surface 6521. The contact surface 6521 of the restriction member 652 is a planar surface extending along the plane XY.

The restriction member 652 is in contact with the side surface 161b of the first facing section 161, so that the position of the contact surface 6521 is restricted in the Z direction. That is, the first facing section 161 restricts the position of the restriction member 652 in the negative Z direction to position the restriction member 652 with respect to the support member 54. Part of the contact surface 6521 of the restriction member 652 is shifted from the facing surface 161a of the first facing section 161 toward the negative Y direction and is in contact with the sixth surface 50f of the first protrusion 151. The restriction member 652 can thus restrict the position of the elongated wavelength conversion member 50 in the positive Z direction. Along with the restriction member 652, the restriction member 651, which is in contact with the fifth surface 50e of the wavelength conversion member 50, further restricts the position of the wavelength conversion member 50 in the positive Z direction. Note that the restriction member 651 is not in contact with the first facing section 161.

The cutout 6522 of the restriction member 652 is formed at a portion of the contact surface 6521, the portion corresponding to a corner 161R formed by the side surface 161b and the facing surface 161a of the first facing section 161. That is, the restriction member 652, which has the contact surface 6521 having the cutout 6522 formed at the position corresponding to the corner 161R, where burrs are most likely to be generated in the first facing section 161, can suppress contact between the burrs formed at the corner 161R and the contact surface 6521. Therefore, since no burrs are present between the contact surface 6521 of the restriction member 652 and the first facing section 161, the restriction member 652 and the first facing section 161 cannot be brought into close contact with each other, so that a decrease in accuracy of the positioning performed by the restriction member 652 and other problems can be suppressed.

The second facing section 162 having the same configuration as that of the first facing section 161 has a facing surface 162a, which faces the fourth surface 50d of the second protrusion 152, as shown in FIG. 2. A gap is provided between the facing surface 162a of the second facing section 162 and the fourth surface 50d of the second protrusion 152. That is, the second protrusion 152 in the present embodiment is not in contact with the second facing section 162.

Therefore, even when burrs are generated at the end surface of the facing surface 162a, the second protrusion 152 of the wavelength conversion member 50 is not lifted by the burrs. A change in the orientation of the mirror 53 fixed to the second surface 50b of the second protrusion 152 can thus be suppressed. Desired optical characteristics of the light source apparatus can therefore be achieved by accurately extracting the light reflected off the mirror 53.

The second facing section 162 restricts the position of the restriction member 654 in the positive Z direction to position the restriction member 654 with respect to the support member 54. Along with the restriction member 654, the restriction member 653, which is in contact with the fifth surface 50e of the wavelength conversion member 50, further restricts the position of the wavelength conversion member 50 in the positive Z direction. Furthermore, the restriction member 654, which has a cutout at a position corresponding to the corner where burrs are most likely to be generated in the second facing section 162, can be brought into close contact with the side surface of the second facing section 162.

As described above, the light source apparatus 100 according to the present embodiment includes the light emitters 56, which emit the excitation light E, the wavelength conversion member 50, which the excitation light E emitted from the light emitters 56 enters, the angle conversion member 52, which converts the angular distribution of the fluorescence Y output from the wavelength conversion member 50, and the support member 54, which has the groove 154, which supports the wavelength conversion member 50. The wavelength conversion member 50 has the first surface 50a and the second surface 50b, which are located at sides opposite from each other in the X-axis, the third surface 50c and the fourth surface 50d, which are located at sides opposite from each other in the Y-axis, which intersects with the X-axis, and the fifth surface 50e and the sixth surface 50f, which are located at sides opposite from each other in the Z-axis, which intersects with the X-axis and the Y-axis.

The light emission surface 56a of each of the light emitters 56 faces the third surface 50c of the wavelength conversion member 50, and the groove 154 has the support surface 54s, which supports the fourth surface 50d of the wavelength conversion member 50. The wavelength conversion member 50 includes the first protrusion 151, which protrudes from the groove 154 toward the positive X direction. The first protrusion 151 has the first surface 50a. The angle conversion member 52 is fixed to the first surface 50a of the first protrusion 151. The support member 54 is not in contact with the first protrusion 151.

In the light source apparatus 100 according to the present embodiment, since the first protrusion 151 of the wavelength conversion member 50, which protrudes from the groove 154, is not in contact with the support member 54, foreign matter such as burrs is not present between the support member 54 and the first protrusion 151. The lift of the first protrusion 151 located at the one end side of the elongated wavelength conversion member 50 is therefore suppressed, so that the change in the orientation of the angle conversion member 52 fixed to the first surface 50a of the first protrusion 151 can be suppressed. The angle conversion member 52 is therefore accurately oriented, so that desired optical characteristics of the light source apparatus 100 can be achieved by accurately extracting the fluorescence Y from the angle conversion member 52.

The projector 1 according to the present embodiment includes the light source apparatus 100, which accurately extracts the fluorescence Y from the angle conversion member 52, and therefore provides excellent light utilization efficiency.

The technical scope of the present disclosure is not limited to the embodiment described above, and a variety of changes can be made thereto to the extent that the changes do not depart from the intent of the present disclosure.

For example, the light source apparatus 100 according to the aforementioned embodiment has been described with reference to the case where the wavelength conversion member 50 includes the first protrusion 151 and the second protrusion 152 in the X-axis direction by way of example, and the wavelength conversion member 50 may include only the first protrusion 151. In this case, the position restrictors 65 are disposed only at the side facing the first protrusion 151.

Out of the position restrictors 65 in the embodiment described above, the restriction member 652 is in contact with the first facing section 161 and the sixth surface 50f of the first protrusion 151, and the restriction member 651 is in contact with the fifth surface 50e of the first protrusion 151. Instead, the restriction member 651 may be in contact with the first facing section 161 and the fifth surface 50e of the first protrusion 151, and the restriction member 652 may be in contact with the sixth surface 50f of the first protrusion 151.

In the embodiment described above, each wall surface of the groove 154 of the support member 54 has a portion perpendicular to the support surface 54s and a portion inclining with respect to the support surface 54s, but the groove 154 does not necessarily have a specific shape, and all the regions of the wall surfaces of the groove may instead, for example, be perpendicular to the support surface. Still instead, the wall surfaces of the groove may be curved.

The aforementioned embodiment has been described with reference to the case where the present disclosure is applied to the light source apparatus including the wavelength conversion member. In place of the configuration described above, the present disclosure may be applied to a light source apparatus in which the light having entered the light source apparatus propagates without being involved in wavelength conversion and then exits out of the light source apparatus, for example, with the angular distribution controlled. In this case, the wavelength conversion member in the embodiment described above is replaced with a light guide member, and the light output from the light emitters exits out of the angle conversion member as light having the same wavelength band.

In addition, the specific descriptions of the shape, the number, the arrangement, the materials, and other factors of the components of the light source apparatus and the projector are not limited to those in the embodiment described above and can be changed as appropriate. The aforementioned embodiment has been described with reference to the case where the light source apparatus according to the present disclosure is incorporated in a projector using liquid crystal panels, but not necessarily. The light source apparatus according to the present disclosure may be incorporated in a projector using a digital micromirror device as each of the light modulators. The projector may not include a plurality of light modulators and may instead include only one light modulator.

The aforementioned embodiment has been described with reference to the case where the wavelength conversion member 50 is pressed against the support member 54 by the two pressing members 90, but the number of pressing members 90 is not limited two. For example, when an enough amount of excitation light E that enters the wavelength conversion member 50 from the light emitters 56 can be secured, three or more pressing members 90 may be provided.

The aforementioned embodiment has been described with reference to the case where the light source apparatus according to the present disclosure is incorporated in a projector, but not necessarily. The light source apparatus according to the present disclosure may be used as a lighting apparatus, a headlight of an automobile, and other components.

The present disclosure will be summarized below as additional remarks.

Additional Remark 1

A light source apparatus including
a light emitter that outputs light,
a light guide member that the light emitted from the light emitter enters,
an angle conversion member that converts the angular distribution of the light output from the light guide member, and
a support member having a groove that supports the light guide member,
the light guide member having a first surface and a second surface located at sides opposite from each other in a first axis of the light guide member, a third surface and a fourth surface located at sides opposite from each other in a second axis that intersects with the first axis, and a fifth surface and a sixth surface located at sides opposite from each other in a third axis that intersects with the first and second axes,
the light emission surface of the light emitter facing the third surface of the light guide member,
the groove having a support surface that supports the fourth surface of the light guide member,
the light guide member including a first protrusion that protrudes from the groove toward one side of the first axis,
the first protrusion having the first surface,
the angle conversion member fixed to the first surface of the first protrusion, and
the support member not being in contact with the first protrusion.

In the thus configured light source apparatus, since the first protrusion of the light guide member, which protrudes from the groove, is not in contact with the support member, foreign matter such as burrs is not present between the support member and the first protrusion. The lift of the first protrusion located at the one end side of the light guide member is therefore suppressed, so that the change in the orientation of the angle conversion member fixed to the first surface of the first protrusion can be suppressed. The angle conversion member is therefore accurately oriented, so that desired optical characteristics of the light source apparatus can be achieved by accurately extracting the light from the angle conversion member.

Additional Remark 2

The light source apparatus described in the additional remark 1,
in which the support member holds the angle conversion member.

When the orientation of the angle conversion member changes, stress is induced in a fixing portion of the angle conversion member that is fixed to the first surface, possibly resulting in breakage of the fixing portion. The configuration described above can prevent breakage due to the change in the orientation of the angle conversion member.

Additional Remark 3

The light source apparatus described in the additional remark 1 or 2,
in which the light guide member further includes a second protrusion that protrudes from the groove toward the other side of the first axis,
the second protrusion has the second surface,
a mirror that reflects the light guided through the interior of the light guide member is provided at the second surface of the second protrusion, and
the support member is not in contact with the second protrusion.

According to the configuration described above, since the second protrusion of the light guide member, which protrudes from the groove, is not in contact with the support member, foreign matter such as burrs is not present between the support member and the second protrusion. The lift of the second protrusion located at the other end side of the light guide member is therefore suppressed, so that a change in the orientation of the mirror provided at the second surface of the second protrusion can be suppressed. The mirror is therefore accurately oriented, so that desired optical characteristics of the light source apparatus can be achieved by accurately extracting the light reflected off the mirror.

Additional Remark 4

The light source apparatus described in any one of the additional remarks 1 to 3,
further including a pressing member that presses the light guide member against the support member,
the pressing member disposed so as to face the support surface of the groove.

According to the configuration described above, the pressing member allows the light guide member to be satisfactorily in contact with the support surface of the groove.

Additional Remark 5

The light source apparatus described in any one of the additional remarks 1 to 4, further including a position restrictor that restricts movement of the light guide member in the direction along the third axis.

According to the configuration described above, the position of the light guide member in the direction along the third axis can be restricted. The light guide member can therefore be accurately disposed in the groove in the direction along the third axis.

Additional Remark 6

The light source apparatus described in the additional remark 5, in which
the support member further includes a facing section disposed at a position recessed from the support surface of the groove in the direction along the second axis and facing the fourth surface of the first protrusion, and
the position restrictor includes a first restriction member in contact with one of the fifth surface and the sixth surface of the light guide member and the facing section, and a second restriction member in contact with the other of the fifth surface and the sixth surface of the light guide member.

According to the configuration described above, the first restriction member is in contact with the facing section, so that the first restriction member is positioned with respect to the support member. Holding the fifth surface and the sixth surface of the light guide member between the first restriction member and the second restriction member therefore allows the light guide member to be accurately disposed in the groove in the direction along the third axis.

Additional Remark 7

The light source apparatus described in the additional remark 6, in which
the first restriction member includes cutout provided at a position corresponding to a corner of the facing section.

According to the configuration described above, the first restriction member includes the cutout at the position corresponding to the corner of the facing section, where burrs are most likely to be generated, so that contact between the burrs formed at the corner and the first restriction member can be suppressed. No burrs are therefore present between the first restriction member and the facing section, so that the first restriction member and the facing section can be brought into close contact with each other.

Additional Remark 8

The light source apparatus described in any one of the additional remarks 1 to 7, in which
the light emitter emits first light having a first wavelength band, and
the light guide member is a wavelength conversion member that contains a phosphor, converts the first light emitted from the light emitter into second light having a second wavelength band different from the first wavelength band, and outputs the second light.

The light source apparatus achieved in accordance with the configuration described above can efficiently use the first light and generate the second light having desired intensity.

Additional Remark 9

A projector including
the light source apparatus described in any one of the additional remarks 1 to 8,
a light modulator that modulates light output from the light source apparatus in accordance with image information, and
a projection optical apparatus that projects the light modulated by the light modulator.

The thus configured projector, which includes the light source apparatus described above, can be a projector that excels in light utilization efficiency.

What is claimed is:

1. A light source apparatus comprising:
a light emitter that outputs light;
a light guide member that the light emitted from the light emitter enters;
an angle conversion member that converts an angular distribution of light output from the light guide member; and
a support member having a groove that supports the light guide member,
wherein the light guide member has a first surface and a second surface located at sides opposite from each other in a first axis of the light guide member, a third surface and a fourth surface located at sides opposite from each other in a second axis that intersects with the first axis, and a fifth surface and a sixth surface located at sides opposite from each other in a third axis that intersects with the first and second axes,
a light emission surface of the light emitter faces the third surface of the light guide member,
the groove has a support surface that supports the fourth surface of the light guide member,
the light guide member includes a first protrusion that protrudes from the groove toward one side of the first axis,
the first protrusion has the first surface,
the angle conversion member is fixed to the first surface of the first protrusion,
the support member is not in contact with the first protrusion,
the support member further includes a facing section disposed at a position recessed from the support surface of the groove in a direction along the second axis and facing the fourth surface of the first protrusion, and
a position restrictor includes a first restriction member in contact with one of the fifth surface and the sixth surface of the light guide member and the facing section, and a second restriction member in contact with another of the fifth surface and the sixth surface of the light guide member.

2. The light source apparatus according to claim 1, wherein
the support member holds the angle conversion member.

3. The light source apparatus according to claim 1, wherein
the light guide member further includes a second protrusion that protrudes from the groove toward another side of the first axis,
the second protrusion has the second surface,
a mirror that reflects the light guided through an interior of the light guide member is provided at the second surface of the second protrusion, and
the support member is not in contact with the second protrusion.

4. The light source apparatus according to claim 1, further comprising a pressing member that presses the light guide member against the support member,
wherein the pressing member is disposed so as to face the support surface of the groove.

5. The light source apparatus according to claim 1, wherein a position restrictor that restricts movement of the light guide member in a direction along the third axis.

6. The light source apparatus according to claim 1, wherein
the first restriction member includes a cutout provided at a position corresponding to a corner of the facing section.

7. The light source apparatus according to claim 1, wherein
the light emitter emits first light having a first wavelength band, and
the light guide member is a wavelength conversion member that contains a phosphor, converts the first light emitted from the light emitter into second light having a second wavelength band different from the first wavelength band, and outputs the second light.

8. A projector comprising:
the light source apparatus according to claim 1;
a light modulator that modulates light output from the light source apparatus in accordance with image information; and
a projection optical apparatus that projects the light modulated by the light modulator.

* * * * *